(12) United States Patent
Klein et al.

(10) Patent No.: US 10,150,064 B2
(45) Date of Patent: Dec. 11, 2018

(54) FILTER APPARATUS

(71) Applicant: HYDAC FILTERTECHNIK GMBH, Sulzbach/Saar (DE)

(72) Inventors: Volkmar Klein, Zweibruecken (DE); Michael Sakraschinsky, St. Ingbert (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 15/557,514

(22) PCT Filed: Jan. 12, 2016

(86) PCT No.: PCT/EP2016/000043
§ 371 (c)(1),
(2) Date: Sep. 12, 2017

(87) PCT Pub. No.: WO2016/146227
PCT Pub. Date: Sep. 22, 2016

(65) Prior Publication Data
US 2018/0050285 A1    Feb. 22, 2018

(30) Foreign Application Priority Data

Mar. 19, 2015  (DE) .................. 10 2015 003 604
Mar. 19, 2015  (DE) .................. 10 2015 003 606

(51) Int. Cl.
*B01D 29/23*   (2006.01)
*B01D 35/143*  (2006.01)
(Continued)

(52) U.S. Cl.
CPC ........... *B01D 29/23* (2013.01); *B01D 29/606* (2013.01); *B01D 35/147* (2013.01);
(Continued)

(58) Field of Classification Search
CPC .. B01D 29/23; B01D 29/606; B01D 35/1435; B01D 35/153; B01D 35/147; B01D 35/143; B01D 37/046
See application file for complete search history.

(56) References Cited

U.S. PATENT DOCUMENTS

| | | |
|---|---|---|
| 3,070,232 A | 12/1962 | Casaleggi |
| 3,344,923 A | 10/1967 | Pall et al. |
| 4,654,140 A | 3/1987 | Chen |

FOREIGN PATENT DOCUMENTS

| | | |
|---|---|---|
| DE | 2 335 276 | 2/1974 |
| DE | 10 2005 043 752 | 5/2007 |
| DE | 10 2010 063 822 | 6/2012 |

OTHER PUBLICATIONS

International Search Report (ISR) dated Mar. 29, 2016 in International (PCT) Application No. PCT/EP2016/000043.

*Primary Examiner* — Terry K Cecil
(74) *Attorney, Agent, or Firm* — Wenderoth, Lind & Ponack, L.L.P.

(57) ABSTRACT

A filter apparatus includes a filter housing having a filter head (3) and a filter bowl (7). The housing accommodates a filter element that separates a non-filtrate side (15) from a filtrate side (17). A differential pressure measurement device (59) indicates at least a blockage of the filter element during filtration operation and has a measurement piston (91) that is guided in a measurement housing (88) in a longitudinally displaceable manner. An end face (90) of that piston is subjected to the instantaneous pressure of the non-filtrate side (15). The opposite end face of the piston is subjected to the instantaneous pressure of the filtrate side (17). Each instantaneous pressure passes into the measurement housing (88) via at least one conduit (57, 61, 65, 89). At least a section (57, 61) of the conduit is arranged in an element cap (43) of the filter element.

16 Claims, 4 Drawing Sheets (51) Int. Cl.
  *B01D 35/147*    (2006.01)
  *B01D 35/153*    (2006.01)
  *B01D 37/04*     (2006.01)
  *B01D 29/60*     (2006.01)
(52) U.S. Cl.
  CPC ....... *B01D 35/1435* (2013.01); *B01D 35/153* (2013.01); *B01D 37/046* (2013.01); *B01D 2201/295* (2013.01)

FILTER APPARATUS

FIELD OF THE INVENTION

The invention relates to a filter device, comprising a filter housing having a filter head and a filter bowl. The housing accommodates a filter element that separates a non-filtrate side from a filtrate side. A differential pressure measurement device indicates at least a blockage of the filter element during the filtering operation and has a measurement piston that is guided in a measurement housing in a longitudinally displaceable manner. The instantaneous pressure of the non-filtrate side is applied to an end face of the measurement piston. The instantaneous pressure of the filtrate side is applied to the opposite end face of that measurement piston. Each instantaneous pressure arrives in the measurement housing via at least one channel run.

BACKGROUND OF THE INVENTION

Filter devices of this kind having a variety of different designs and with exchangeable filter elements that conform to various specifications are prior art. The filter elements are used in such filter devices for maintenance of fluids, in particular in oil-hydraulic systems. In order to guarantee the operational reliability of such units, which is largely dependent on the faultless performance of the filter devices, such filter elements are commonly monitored with respect to their dirt retention capability by differential pressure measurement (DE 10 2005 043 752 B3) so as to avoid the risk of breakdowns or even damage occurring due to overloading, which can result in significant economic losses in the case of expensive systems.

SUMMARY OF THE INVENTION

In view of these problems, the problem addressed by the invention is to provide a filter device of the type described above, which is simply constructed and can be produced in a cost-efficient manner.

According to the invention, this problem is solved by a filter device having, as a significant distinguishing feature of the invention, at least a part of the channel run, by which the instantaneous pressure of the non-filtrate side arrives at the measurement housing of the measurement device, is arranged on the filter element in an element cap thereof. Because the element cap in the filter elements in question can be produced in an economical manner by injection molding, in particular from a plastic, a channel run integrated therein allows particularly cost-efficient production of the device as a whole. This element cap with the integrated channel run particularly preferably forms a receiving part forming a casing for an end of the filter material of the filter element. The end of the filter material is particularly preferably accommodated in an adhesive bed of the receiving part. However, the end of the filter material with a separate end cap can then in turn be integrated or accommodated in the receiving part of that element cap with the channel run.

In advantageous exemplary embodiments, the part of the channel run arranged in the element cap ends with its one free end on the non-filtrate side of the filter element and with its other free end in a collection chamber. The collection chamber protrudes from the external circumference of the element cap and is delimited at opposite end faces in a sealing manner on the one hand by a cover part arranged in a detachable manner on the top side of the filter head and on the other hand by parts of the filter head. Two opposite boundary walls of the collection chamber are formed by device parts that are already present, namely, the cover part and the filter head, resulting in a corresponding material saving for the element cap itself.

With regards to the formation of the additional parts of the channel run extending up to the measurement device, advantageously the collection chamber as part of the channel run can have at the base side a passage formed in the filter head. A transverse channel extending in the measurement housing is connected to that passage, which transverse channel leads by its other free end to the back end face of the measurement piston.

The measurement piston can be pressurized with an energy store, such as a compression spring, which seeks to displace the measurement piston in the backwards direction, with the front end face of the measurement piston abutting an end piece of the measurement housing. The measurement housing comprises a passage as an additional part of the channel run, at which the instantaneous pressure on the filtrate side is applied.

As regards the design of the part of the channel run located in the element cap, the part of the channel run in the element cap of the filter element that opens into the collection chamber can overlap the top end of the filter material and can follow the cover part in a parallel manner. The other part of the channel run, arranged perpendicular thereto, can be accommodated by a receiving support extending in the radial direction and being guided, with a projection, on the inner side of the filter element that forms the non-filtrate side.

In particularly advantageous exemplary embodiments, the collection chamber is a component of an annular sealing system, which is arranged at the external circumference on a receiving crown. The receiving crown is held by a ring of radially arranged supports, which are connected to an end-face receiving part for the top end of the filter material. A conical guide body extends axially from the internal circumference of the receiving part into the inner side of the filter element being connected to the receiving part. The supports continue on the inner side of the guide body. One of these supports forms the receiving support for the part of the channel run extending to the non-filtrate side. In this design, the receiving crown, the supports, the receiving part and the guide part, integrally connected to each other, form the element cap.

The arrangement can also advantageously be such that the sealing system has a molded seal at the external circumference, which molded seal surrounds a surrounding wall of the receiving crown of the element cap. By the formed external enclosure of the receiving crown, the sealing system at the same time forms the housing sealing of the entire fluid system relative to the environment.

For the installation of the measurement housing, the filter head can have, at the point of the intervention of the differential pressure measurement device, a projecting connection wall, into which the measurement housing is screwed at the end face.

In particularly advantageous exemplary embodiments, as part of the differential pressure measurement device, projecting further towards the outside, an evaluation unit is connected to the measurement housing which is to this extent formed closed. The evaluation unit indicates to an observer, in particular in an optical manner, whether the filter element in filtering operation is blocked or is still capable of filtering.

In one particularly advantageous formation of the differential pressure measurement device, the measurement piston of the measurement device has a permanent magnet. In the filtering-capable state of the filter element and acting against the action of an energy store, in particular in the form of a compression spring, the permanent magnet of the measurement piston holds a permanent magnet of an evaluation piston. The evaluation piston is guided in a housing of the evaluation unit in a longitudinally displaceable manner, from a position that it leaves and moves in the direction of an additional position as soon as the permanent magnet of the measurement piston moves away from the permanent magnet of the evaluation piston due to the constant instantaneous pressure on the back end face and due to the falling instantaneous pressure on the opposite, front end face of the measurement piston brought about by a blockage of the filter element. This arrangement provides an indication that clearly signals the transition from the filtering-capable state to the blocked state of the filter element. This indication is also advantageously suitable for an electric signaling, for example by a sensor that recognizes the position of the evaluation piston in a contact-free manner.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
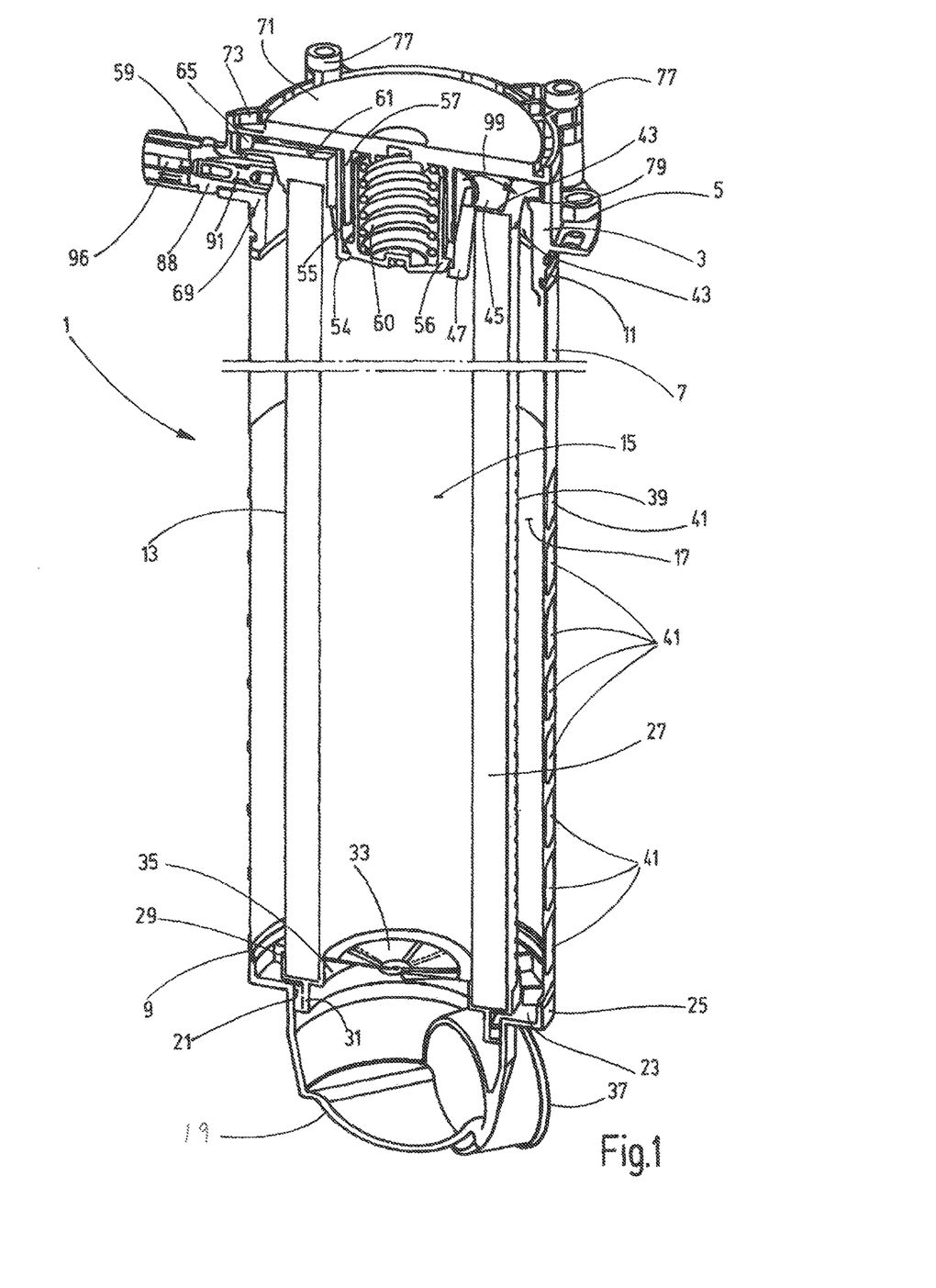
FIG. 1 is a schematically simplified, perspective view in section and truncated in the longitudinal direction of a filter device according to an exemplary embodiment of the invention.
Figure 2:
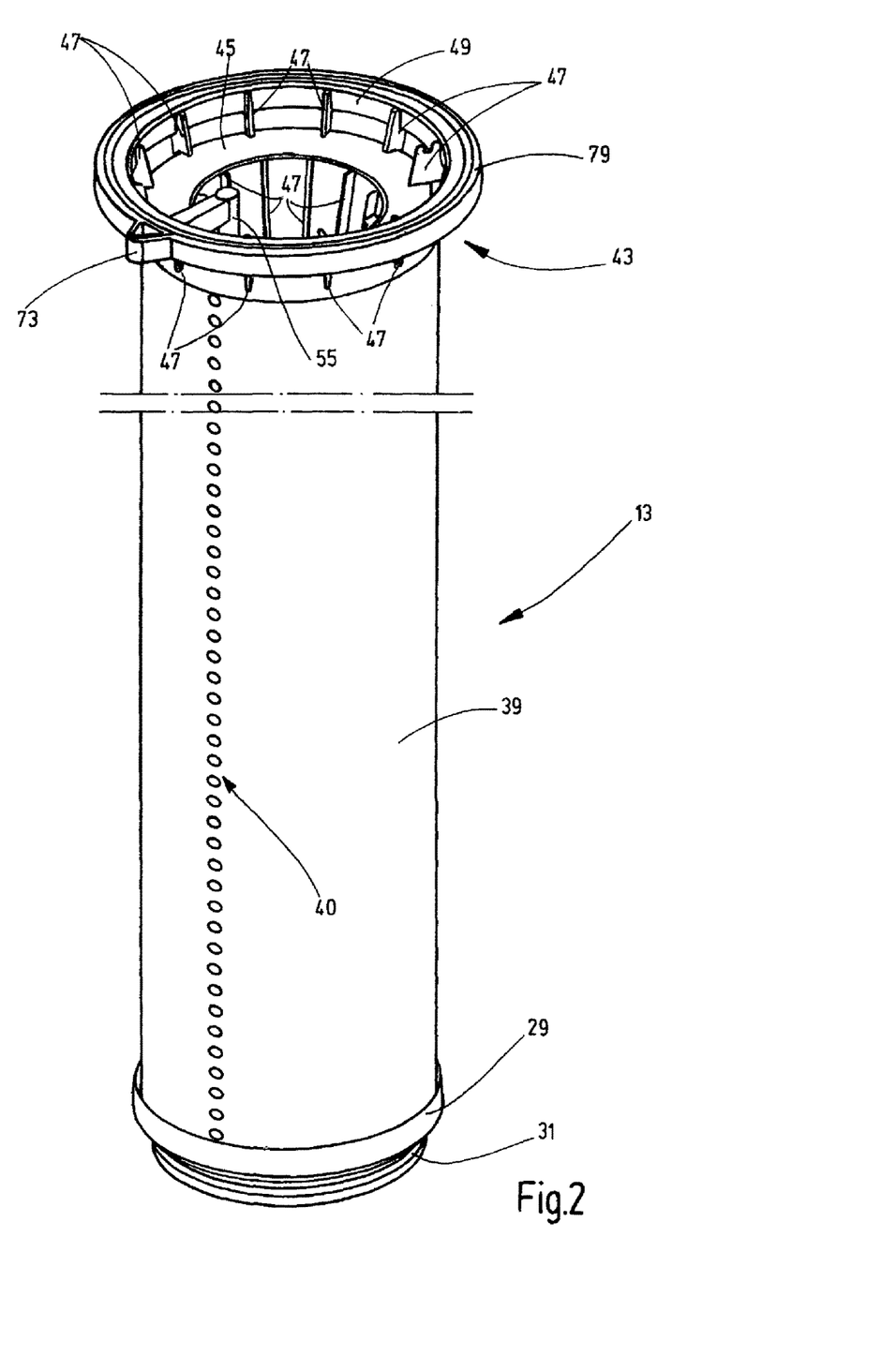
FIG. 2 is an enlarged and truncated perspective view of the separately depicted filter element of the filter device of FIG. 1.

With reference to the attached drawings, the invention is explained using the example of an in-tank filter device. A filter housing 1 has a filter head 3 with a fastening flange 5 is situated at the outside of the filter head. By means of this fastening flange 5, the filter housing 1 can be mounted on the edge of a top wall opening of a storage container or tank (not depicted) in such a way that a filter bowl 7, which connects to the bottom end of the filter head 3, extends in the vertical direction into the inside of the tank. The length of the filter bowl 7 depicted truncated in FIGS. 1 and 2 is dimensioned such that the bottom end 9 of the filter bowl 7 is situated below the lowest level of fluid, e.g. hydraulic oil, which can be expected during operation. In the design as an in-tank filter device, the filter bowl 7 in the form of a relatively thin-walled circular cylinder is fixed to the filter head 3 by a crimping 11. The invention can be used not only in in-tank filter devices, but also in other types of filter devices, in which a differential pressure measurement device monitoring the operational state of the associated filter element is provided.

For the filtering operation, a filter element 13 is received in an exchangeable manner in the housing 1 and can be flowed through from its inner side 15 forming the non-filtrate side to its outer side 17 forming the filtrate side. An inflow housing 19 is located at the bottom end 9 of the filter bowl 7. The inflow housing forms, at its top opening 21 leading to the inner side 15 of the filter element 13, a base 23 that extends radially outwards. The circumferential edge 25 of base 23 surrounds the bottom end 9 of the filter bowl 7. The filter element 13 has an end cap 29 at the bottom end of its hollow cylinder-shaped filter material 27. This end cap 29 engages with its end annular body 31 into the opening 21 of the inflow housing 19. A flap valve 33 is arranged at the central passage 35 of the end cap 29 and opens for the flow of the fluid from the inlet connection 37 of the inflow housing 19 to the inner side 15 of the filter element 13. In the filtering process occurring from the inside outwards through the filter material 27, the filter material 27 is supported against the flow forces by an external sheath 39, which has a perforation indicated in FIG. 2 simply by a row of holes 40. In the real embodiment, the perforation extends over the entire surface of the sheath 39 that forms a kind of external support tube. Instead of a sheath with perforations, a grid structure or the like could also be provided. For the purpose of the outlet of the filtrate from the outer side 17 to the tank interior, window openings 41 are formed in the filter bowl 7. In accordance with the prior art that applies to in-tank filters, the window openings 41 are not arranged over the entire length of the filter bowl 7, but instead only in selected surface areas. For example, the window openings 41 can, in accordance with the teaching provided in this respect by EP 2 249 941 B1 and with adaption to the operational fluid level of the tank, be arranged such that any gas bubbles located in the cleaned fluid can be separated and/or can be collected for a discharge.

Figure 3:
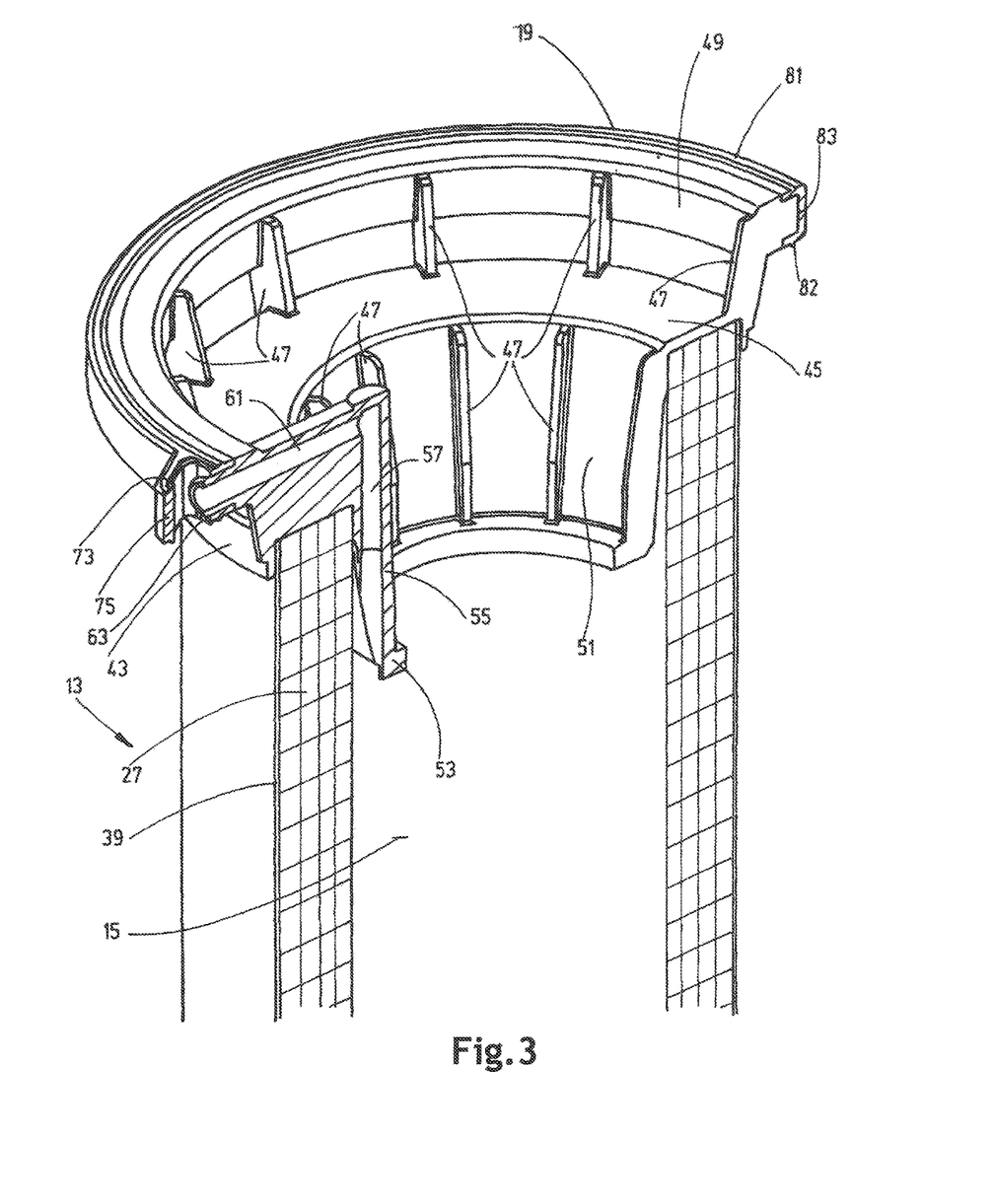
FIG. 3 is a further enlarged, partial perspective view, of only the element cap-comprising top end region of the filter element of the filter device of FIG. 1.
Figure 4:
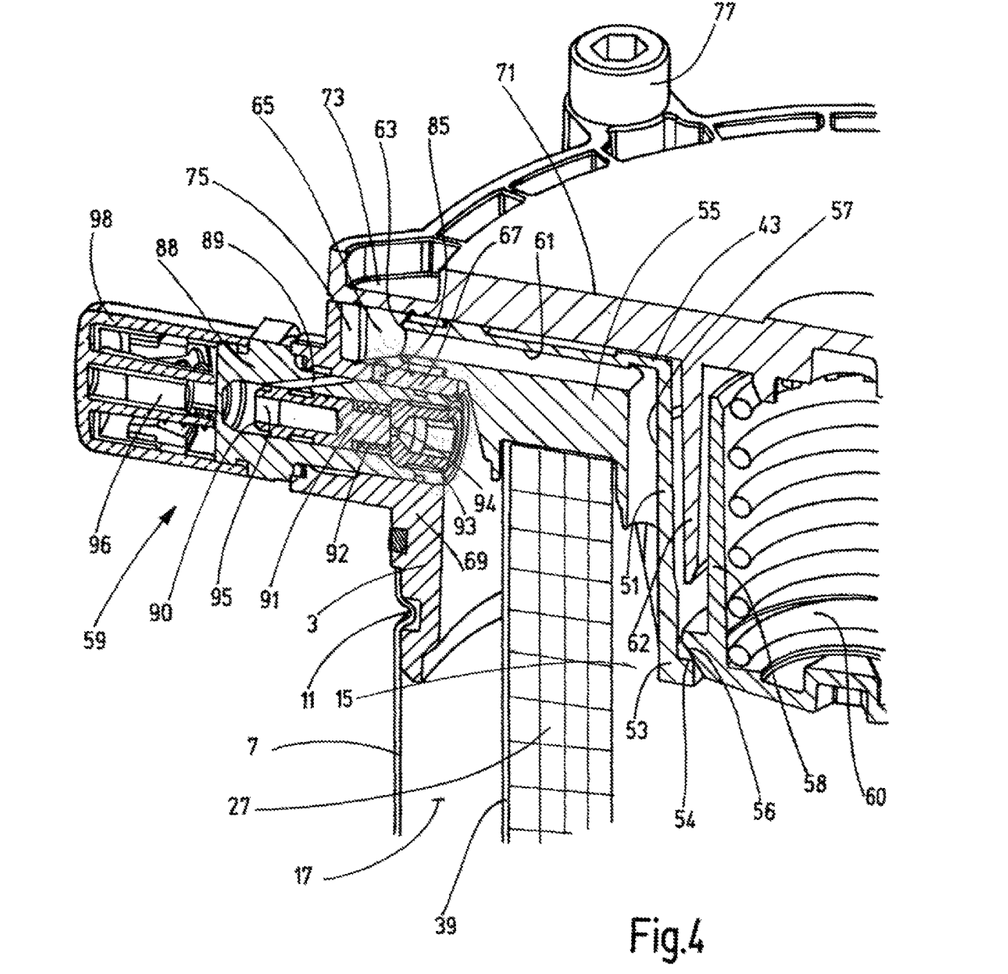
FIG. 4 is an enlarged, partial perspective view in section of only the differential pressure measurement device-comprising top partial region of the filter device of FIG. 1.

As is shown more clearly by FIGS. 2 to 4, the filter element 13 has at its top side a specially formed element cap 43, which is injection molded from a plastic material. As the central component, the element cap 43 has a receiving part 45 in the form of a planar annulus, as is standard in filter element end caps. The receiving part 45 forms an enclosure for the facing end of the filter material 27. The external circumference of the receiving part 45 surrounds a ring of uniformly distributed, plate-like supports 47. The planes of supports 47 extend in the radial direction and form the brackets for an annular receiving crown 49. Receiving crown 49 is located at an axial distance from the receiving part 45 and at a radial distance from the outer side of the remainder of the filter element 13. A guide part 51 is connected to the bottom side of the receiving part 45 at the internal circumference thereof. The guide part 51 has the form of a hollow cone, extends axially with its tapered end into the filter element inner side 15, and ends at the bottom edge in a rib 53 projecting radially inwards.

The supports 47 continue below the receiving part 45 along the inner side of the guide part 51 as an additional ring of the supports 47, which project radially inwards and extend from the bottom side of the receiving part 45 to the rib 53 on the guide part 51. One of the supports forms a receiving support 55, in which a channel section 57 extends in the vertical direction and opens at its bottom free end into the inner side 15 forming the non-filtrate side. This channel section 57 forms a part of a channel run, by which the instantaneous pressure of the inner side 15 arrives at a differential pressure measurement device 59 belonging to the filter device. For this purpose, a channel section 61 extends perpendicular to the channel section 57 and is connected to the top closed end of channel section 57. Channel section 61 extends in the radial direction and opens with its free end 63 into a collection chamber 65, which forms an additional part of the channel run.

The base of the collection chamber 65 is formed by a wall part 67 of a connection region 69 that projects radially from the filter head 3. At the top side opposite the wall part 67, the collection chamber 65 is delimited by a housing cover part 71, which has a radial protrusion 73 overlapping a radially projecting wall part 75 that forms the side wall of the collection chamber 65. The cover part 71 is detachably connected by fastening screws 77 to the filter head 3. As is most clearly shown by FIG. 3, the circumferential edge of the receiving crown 49 is overlapped by a molded seal 79. Molded seal 79 has a U-shaped cross section and forms with its top profile limb 81 the seal with the cover part 71, while its bottom profile limb 82 and its profile support 83 extending axially between the limbs 81, 82 form the seal relative to the filter bowl 7. The molded seal 79 then forms both the seal of the overall fluid system situated above the tank wall. Because the molded seal 79 extends over the radially projecting protrusion 73, it forms the seal of the collection chamber 65.

For the purpose of continuation of the channel run, a passage 85 is formed in the base of the collection chamber 65. Passage 85 extends through the wall part 67 into the bore 87 of the connection region 69, into which the measurement housing 88 of the measurement device 59 can be screwed. A transverse channel 89 is formed in the measurement housing 88. The transverse channel is connected to the passage 85 and continues the channel run up to the back end face 90 of a measurement piston 91. Piston 91 is pretensioned in the measurement housing 88 by a compression spring 92 for a movement in the radially outwardly occurring backwards direction. The measurement housing 88 is closed by an end piece 93 at the radially inner end, which abuts the outer side 17 of the filter element 13 that forms the filtrate side, in which end piece an additional passage 94 is located. By passage 94 the facing end face of the measurement piston 91 is pressurized with the instantaneous pressure of the filtrate side. During filtering operation the measurement piston 91, which is pressurized on the front end face 90 with the instantaneous pressure of the non-filtrate side by the transverse channel 89, then occupies a piston position corresponding to the differential pressure.

To obtain an indication of the piston position, a permanent magnet 95 is arranged on the radially outerlying end region of the measurement piston 91. In the filtering-capable state of the filter element 13, the measurement piston 91 assumes a position under the influence of the compression spring 92, in which position the permanent magnet 95 holds an evaluation piston 96 in an attracted position wherein it contacts thereon. The evaluation piston 96 is displaceable in the measurement housing 88 and is pretensioned by a spring 97 for a movement directed away from the permanent magnet 95. The pressure in front of the filter, for example in the form of the pump pressure, always remains the same during operation. Due to the contamination of the filter mat, the pressure after the filter mat is lower in the case of a contaminated filter element than in the case of an uncontaminated filter element. The pressure on the back end face 90 at the measurement piston 91 then remains the same. When the pressure on the opposite, front end face of the measurement piston 91 drops, so that the measurement piston 91 moves to the right as viewed in FIG. 1 and releases the evaluation piston 96. The evaluation piston 46 then drops away from the permanent magnet 95 of the measurement piston 91, so that the evaluation piston 96 moves outwards in the radial direction, thereby supplying an indication of a blocked state of the filter element 13. For a visible indication of the position of the evaluation piston 96, the measurement housing 88 has at the radial outer end a hood 98 of a transparent material, for example made of plexiglass. A marking can be provided, for example in the form of color marking, to supply an obvious visual indication of the state of the filter element 13. Alternatively or additionally, an electric signaling can be provided, for example by a Hall effect sensor, which recognizes the position of the evaluation piston 96.

The rib 53 at the end of the guide part 51 forming a hollow cone forms a sealing edge 54 for a valve cone 56, which is located on a closure part 58 of a bypass valve. The closure part 58 has the form of a hollow cylinder, which is closed at the end forming the valve cone 56. That closed end forms the seat for a compression spring 60, which is supported at its other side on the cover part 71. The hollow cylindrical closure part 58 is guided in a circular cylindrical guide wall 62, which extends axially away from the cover part 71 into the guide part 51. In the blocked state of the filter element 13 and with lifting of the valve cone 56 from the sealing edge 54 brought about by the non-filtrate pressure, a fluid path is formed that bypasses the filter element 13. That fluid path leads via the top side of the receiving part 45 to the outer side 17 that forms the filtrate side, as shown by the flow arrow 99 in FIG. 1.

The differential pressure measurement device 59 according to the invention not only allows the detection of a blocked filter element 13, but can also establish that there is no filter element 13 at all in the filter element housing. Further, by the evaluation electronics to the differential pressure measurement device 59 in the case of a corresponding "tactile design", the detection of any plagiarized product can be achieved, which may present a different blockage behavior with different differential pressures compared with the original element from the manufacturer, provided that the particulate contamination to be filtered out of the fluid is similar in both cases.

While one embodiment has been chosen to illustrate the invention, it will be understood by those skilled in the art that various changes and modifications can be made therein without departing from the scope of the invention as defined in the claims.

The invention claimed is:
1. A filter device, comprising:
   a filter housing having a filter head and a filter bowl;
   a filter element accommodates in said filter housing and separating a non-filtrate side from a filtrate side in said filter housing;
   an end cap on said filter element;
   a differential pressure measurement device indicating a blockage of said filter element during a filtering operation and having a measurement piston guided for longitudinal displacement in a measurement housing, instantaneous pressure of said non-filtrate side being applied to a first end face of said measurement piston and instantaneous pressure of said filtrate side being applied to an opposite second end face of said measurement piston;
   first and second channel runs in said measurement housing connecting said non-filtrate side and said filtrate side in fluid communication with said first and second end faces, respectively, applying the respective instantaneous pressure to the respective end face of said measurement piston, a part of said first channel run being in said end cap and ending at a first end thereof at said non-filtrate side of said filter element, a second free end of said first channel run ending in a collection chamber projecting from an external circumference of said end cap, being delimited on opposite end faces and being sealed by a cover part detachably arranged on a top side of said filter head and sealed by parts of said filter head.

2. A filter device of claim 1 wherein
said collection chamber is part of said first channel run and has a base side with a passage extending in said filter head; and
a transverse channel extends in said measurement housing, is connected to one end thereof to said passage extending in said filter head and leads at an opposite end thereof to said first end face of said measurement piston.

3. A filter device of claim 1 wherein
an energy store pressurizes said measurement piston for displacement in a backwards direction away from said filter element; and
said second end face of said measurement piston abuts an end piece of said measurement housing, said end piece of said measurement housing having a passage therein as part of said second channel run.

4. A filter device of claim 3 wherein
said energy store comprises a compression spring.

5. A filter device of claim 1 wherein
said part of said first channel run in said end cap comprises a first portion overlapping a top end of said filter element and extending parallel to said cover part and comprises a second portion extending perpendicular to said first portion, being accommodated by a receiving support extending in a radial direction and being guided on an inner side of said filter element forming said non-filtrate side.

6. A filter device of claim 1 wherein
said collection chamber is a component of an annular sealing system at an external circumference of a receiving crown held by a ring of radially extending supports connected to an end-face receiving part on a top end of filter material of said filter element, said receiving part being delimited at an internal circumference thereof by an at least partially conically extending guide part extending away from said internal circumference of said receiving part into an inner side of said filter element, said supports continue on an inner side of said guide part, one of said supports being a receiving support for an end portion of said first channel run extending to said non-filtrate side.

7. A filter device of claim 6 wherein
said receiving crown, said supports, said receiving part and said guide part are integrally connected to each other and form said element cap.

8. A filter device of claim 6 wherein
said annular sealing system comprises a molded seal at said external circumference of said receiving crown, said molded seal surrounding a surrounding wall of said receiving crown.

9. A filter device of claim 1 wherein
said filter head comprises a projecting region, said measurement housing being threaded into said projecting region at an end thereof.

10. A filter device of claim 1 wherein
said differential pressure measurement device comprises an evaluation unit connected to a closed outer end of said measurement housing, said evaluation unit capable of providing an observable indication of whether said filter element is blocked or capable of filtering.

11. A filter device of claim 10 wherein
said observable indication is optical.

12. A filter device of claim 10 wherein
said measurement piston of said measurement device comprises a permanent magnet; and
in a filtering-capable state of said filter element and acting against pressure of an energy store, said measurement permanent magnet holds an evaluation permanent magnet of an evaluation piston guided in an evaluation housing of said evaluation unit for longitudinal movement from a first position, said evaluation magnet and said evaluation piston being movable from the first position to a second position upon said measurement permanent magnet and said measurement piston moving away from said evaluation permanent magnet due to falling pressure on said second end face of said measurement piston due to blockage of said filter element.

13. A filter device, comprising:
a filter housing having a filter head and a filter bowl;
a filter element accommodates in said filter housing and separating a non-filtrate side from a filtrate side in said filter housing;
an end cap on said filter element;
a differential pressure measurement device indicating a blockage of said filter element during a filtering operation and having a measurement piston guided for longitudinal displacement in a measurement housing, instantaneous pressure of said non-filtrate side being applied to a first end face of said measurement piston and instantaneous pressure of said filtrate side being applied to an opposite second end face of said measurement piston;
first and second channel runs in said measurement housing connecting said non-filtrate side and said filtrate side in fluid communication with said first and second end faces, respectively, applying the respective instantaneous pressure to the respective end face of said measurement piston, a part of at least one of said channel runs being in said end cap; and
a projecting region extending from said filter head, said measurement housing being threaded into said projecting region at an end thereof.

14. A filter device of claim 13 wherein said differential pressure measurement device comprises an evaluation unit connected to a closed outer end of said measurement housing, said evaluation unit capable of providing an observable indication of whether said filter element is blocked or capable of filtering.

15. A filter device of claim 14 wherein said observable indication is optical.

16. A filter device of claim 14 wherein said measurement piston of said measurement device comprises a permanent magnet; and in a filtering-capable state of said filter element and acting against pressure of an energy store, said measurement permanent magnet holds an evaluation permanent magnet of an evaluation piston guided in an evaluation housing of said evaluation unit for longitudinal movement from a first position, said evaluation magnet and said evaluation piston being movable from the first position to a second position upon said measurement permanent magnet and said measurement piston moving away from said evaluation permanent magnet due to falling pressure on said second end face of said measurement piston due to blockage of said filter element.

\* \* \* \* \*